Nov. 5, 1968  A. P. NASTASE  3,409,254

SAFETY AIRCRAFT

Filed Jan. 7, 1966  3 Sheets-Sheet 1

INVENTOR.
ANTHONY P. NASTASE
BY
Agent

Nov. 5, 1968  A. P. NASTASE  3,409,254
SAFETY AIRCRAFT

Filed Jan. 7, 1966  3 Sheets-Sheet 2

INVENTOR.
ANTHONY P. NASTASE
BY

Nov. 5, 1968  A. P. NASTASE  3,409,254
SAFETY AIRCRAFT

Filed Jan. 7, 1966  3 Sheets-Sheet 3

INVENTOR.
ANTHONY P. NASTASE
BY

United States Patent Office 3,409,254
Patented Nov. 5, 1968

3,409,254
SAFETY AIRCRAFT
Anthony P. Nastase, 6220 Fontenelle Blvd.,
Omaha, Nebr. 68111
Continuation-in-part of application Ser. No. 411,672,
Nov. 9, 1964. This application Jan. 7, 1966, Ser.
No. 519,243
3 Claims. (Cl. 244—138)

This application is a continuation-in-part of the applicant's co-pending patent application Ser. No. 411,672, filed Nov. 9, 1964, now abandoned.

This invention relates to proposed aircraft of a type in which highly explosive fuel-containing sections are disconnectable and disposable while airborne and more particularly it is an object to provide such proposed aircraft with economic practicality by providing further advantages to offset cost by adding (a) sufficient further safety for the lives of occupants and (b) sufficient further equipment safety from the loss by destruction of disposable sections as to provide sufficient incentive for manufacture of such aircraft to be started.

More particularly it is an object to provide such an aircraft with greater safety through the dropping, not of an entire wing section, but only of a majority of the wing length, specifically the outermost majority section of the wing length with the inner lesser portion of each wing maintained with the fuselage and not dropped so that the inner stub-portions of each wing tend to prevent the fuselage from rolling over upon landing because they provide portions outwardly extending from the fuselage which are adapted (1) either to engage the ground at their outer ends to prevent roll-over, if they have no wheels attached thereto, or (2) adapted to support wheels which then engage the ground outwardly from the main fuselage and prevent roll-over.

Still another object concerns roll-over at crash-landing. Heretofore it has been proposed that an aircraft fuselage be lowered by parachute after dropping gasoline-containing wing sections to eliminate the fire hazard of the gasoline in the wing sections. However, the safety achieved by this prior art construction has not been sufficient to economically attract any actual manufacture of aircraft I know of for achieving only this one single advantage. The disadvantages of the earlier concepts have remained in that the fuselage is in danger of capsizing or roll-over during landing because the absence of wings leaves the fuselage without the protection of the outwardly extending wings which would otherwise tend to prevent dangerous roll-over of the fuselage upon crashing.

Parachute-opening-failure is a further factor. I realize that when an aircraft having a parachute facility crashes, its parachute will tend to prevent roll-over of a wing or fuselage. However, this is not always true. It is not true, for example, if the parachute has not had time to open, as might be the case during (a) a crash during take-off, or (b) during a crash at landing in which the condition causing the crash did not arise until after the aircraft was already without altitude or already touching ground.

In either the (a) or (b) situations, the parachute might well not be sufficiently effective to prevent roll-over of the wing or fuselage. The dangers of roll-over of a fuselage are only partly prevented by seat belts. When seat belts are not fastened, or fastened improperly, a falling passenger could break a neck or back during roll-over; and an elderly person carefully strapped with his seat belt could die of a heart attack or sudden jolt.

Also, during roll-over, more extensive damage to the aircraft itself is almost certain to occur, such as the ripping off of the rear wing sections and also tail damage, all very expensive.

A still further object is to provide an aircraft as described, the entirety or absolutely all of the gas tanks of which are carried in the majority-of-wing-length wing section, whereby upon the dropping of such an outer wing section, the explodable gasoline is gotten rid of.

I am aware that in the prior art, fuel tanks have been placed in tip ends of wings which are droppable, but these tip ends have never been major portions of the wing length, nor have they ever had engines mounted in them.

Another disadvantage of prior art proposals has been in the fact that the expensive engines are almost utterly and completely destroyed from the necessity of dropping the engines to their destruction in emergency in order to protect the fuselage from the explosion of fuel in the engines.

The high cost of the destroyed engines has, as is not hard to understand, been a further great economic factor making impractical the use of prior art proposals. Although military destruction costs have been of lesser alarm than civilian destruction costs, yet the loss of vital hard-to-replace aircraft engines in the pressing days and weeks of war, has been an indirect cause of great loss of life.

A further object is to provide an aircraft as described, the two sections of each wing of which have a fire wall therebetween for preventing the spread of fire from the outer section to the inner section in the period before their disconnection.

It is common for aircraft to become out of control on landing or take-off or in crash-landing so that the plane tilts and one wing strikes the ground. As the fuel-carrying wing breaks off, the fire from the explosion often traps pilots and passengers by poisonous gases and loss of oxygen before escape canopies can be opened.

As the wing breaks off accidentally, the metal bends and bends until it is of a very high heat before breaking off, and this commonly ignites the highly explosive 100-octane fuel. It is a particular object to discard, not only fuel-carrying wing sections, but also the engines because the gas fumes in an engine can also explode. Hydraulic fluid and lubrication oil in an engine can also explode. Fuel in fuel lines leading to an engine represents a further explosion danger that is eliminated by discarding the engine itself.

Still another object is to provide means for safely lowering engines and disconnected wing sections by parachute to preserve their value economically, and also to make possible the availability of the engines and wing sections for analysis and study to determine if they hold clues to possible causes of a crash.

The following drawings and description show examples only, it is understood that this invention is protected against changes therefrom within the scope of the following claims.

Figure 1:
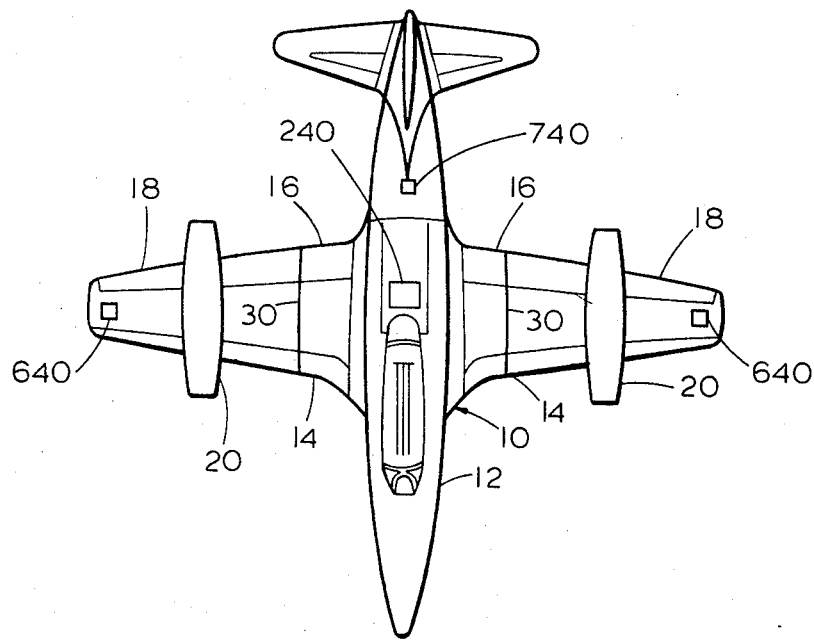
FIGURE 1 is a top plan view of an aircraft of this invention.
Figure 2:
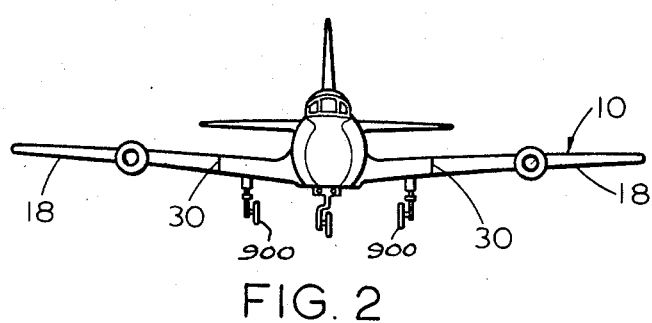
FIGURE 2 is a frontal elevation of the aircraft of FIGURE 1.

Referring to FIGURE 1, the aircraft of this invention is generally shown at 10 and has a main fuselage 12 and wings 14, which latter have inner sections 16 permanently attached to the fuselage 12, and outer sections 18 which in accordance with this invention can be released and discarded, as later described.

The sections 18 are those portions of the wings 14 which include the engines 20 which can be jet engines, as illustrated, and a dividing line or line of joinder 30 between the fixed section 16 and discardable section 18 can be seen in FIGURE 1 to extend forwardly to rearwardly on each wing in a vertical plane.

Figure 3:
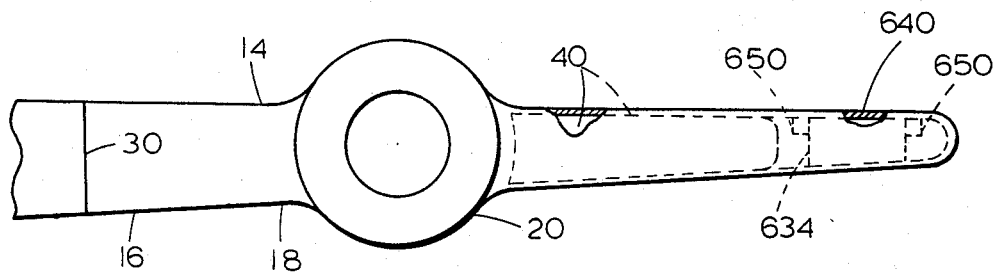
FIGURE 3 is a frontal elevation of a portion of a wing showing its jet engine, and with fuel tank means in the wing shown in dotted lines.

Referring to FIGURE 3, it will be seen that the discardable sections 18 include in them fuel tanks 40, partially shown in full and partially in dotted lines in FIGURE 3. Such fuel tanks normally carry highly explosive fuel and the space between the top of such a fuel tank and the level of liquid fuel therein is filled with fumes that explode very easily.

Figure 4:
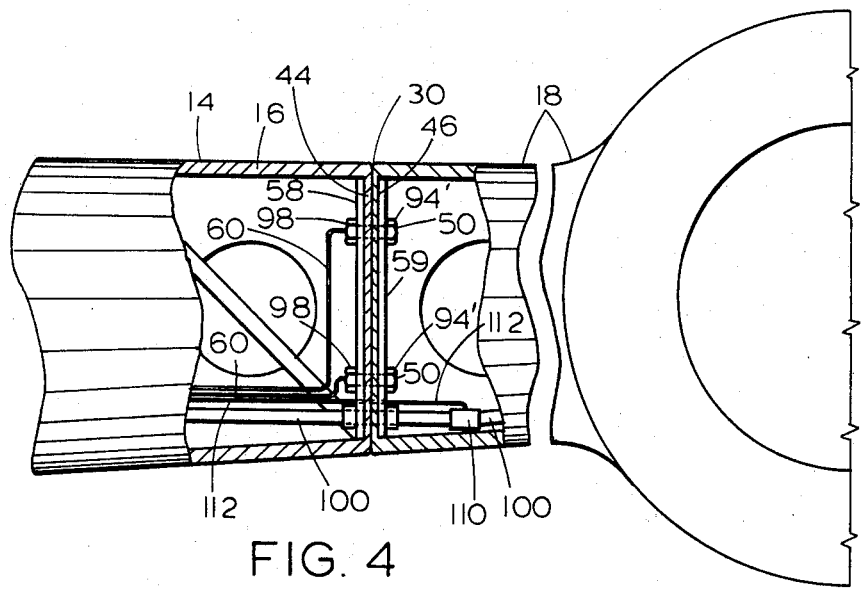
FIGURE 4 is a frontal elevation of an enlarged portion of the wing section of FIGURE 3 with a portion of the forward side of the wing broken away at the point of joinder of a discardable wing section for showing the interior.

In FIGURE 4, it will be seen that the sections 16 and 18 have adjoining vertical walls 44 and 46, which latter, are in vertical planes and held against each other by suitable means such as explosive bolts 50, which latter, extend through the walls 44 and 46 and preferably also through the reinforcing panels 58 and 59, which latter, are disposed on the inner sides respectively of the respective wing sections 16 and 18 and against the walls 44 and 46.

Suitable electrical cords 60 extend from the respective bolts 50 toward the fuselage 12, as best seen in FIGURE 4.

Figure 6:
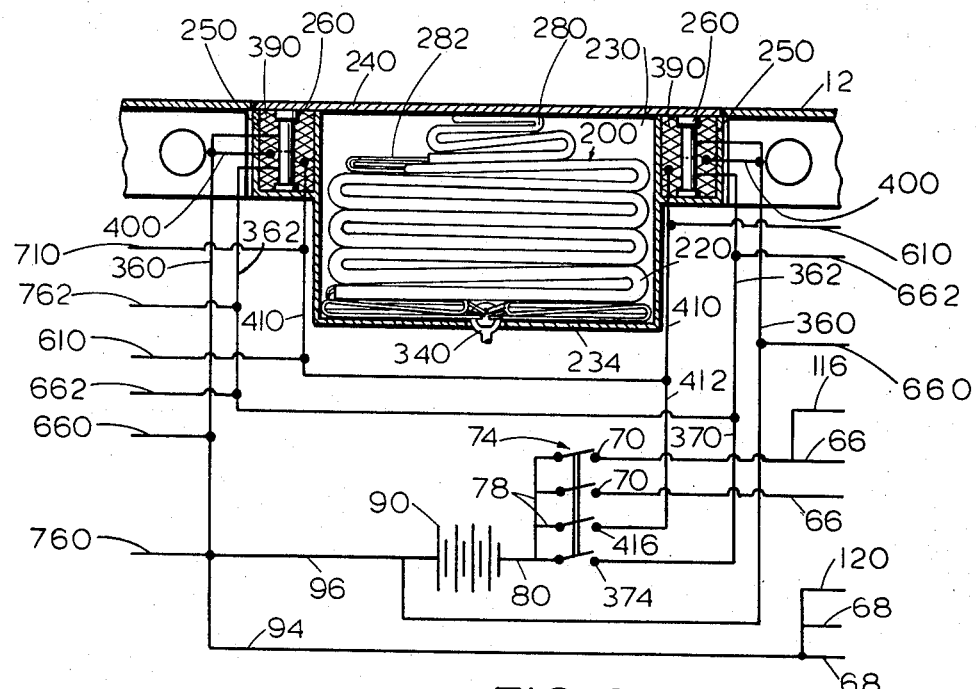
FIGURE 6 is a view taken in vertical section through the upper part of the fuselage of the aircraft substantially down its longitudinal center with certain elements not shown in section for clarity of illustration.

Each cord 60, as seen in FIGURE 6, contains one of two wires 66 and one of two wires 68. The wires 66 are connected to terminals 70 of a multiple throw switch generally indicated at 74. The throws of the switch 74 are themselves connected by wires 78 and 80 to one side of a source of electrical energy idicated at 90 in the form of a battery.

The other two wires 68 are connected by wires 94 and 96 to the other side of the battery 90 whereby the closing of the switch 74 will cause the power from the power source 90 to be delivered to the explosion bolts 50, which would then explode, as they are of conventional explosion bolt construction, whereby they would no longer serve to hold the wing sections 16 and 18 together.

When the bolts 50 are in holding position, they extend through the panels 58 and 59 and the walls 44 and 46, and they have heads 94' at one of their ends and nuts 98 at the other of their ends with the heads 94' and nuts 98 disposed on opposite sides of the vertical walls 44 and 46 respectively of the wing sections 16 and 18.

It will be seen that in FIGURE 6, the electrical system for controlling the explosion bolts in only one of the wings 14 is illustrated, although it will be understood that a similar circuit is used to control similar explosion bolts connecting sections 16 and 18 of the other wing 14.

It will be seen that each wing 14 also has in it other means which is common to its inner and outer sections 16 and 18 and which, therefore, must be released or ruptured in order to attain a full release of the outer wing sections 18. Such an element is shown at 110 and the element 110 can be used to represent a control rod, for example, which shall be identified herein as a control rod 100. In accordance with this invention, an explodable connector 110 is placed in the control rod 100 adjacent the adjoining portions of the inner and outer sections 14 and 18 and the explodable connector 110 has an electrical cord 112 extending from it back to the main fuselage 12 where, as best seen in FIGURE 6, the cord 112 is divided into the wires 116 and 120 which it contains.

The wire 116 can be connected to the wire 66 and the wire 120 can be connected to the wire 68, whereby at times when the explosion bolts 40 are energized for explosion, the wires 116 and 120 in the cord 112 energize the explodable connector 110 for rupturing and releasing the control rod or other element 100.

When the outer wing section 18 with the engine 20 are no longer available to support the main fuselage 12, the concept of this invention has a parachute assembly generally indicated at 200 in FIGURE 6 which is of a size adapted to substantially support the aircraft, or to be more exact, the remainder of the aircraft without its outer wing sections 18 so as to reduce the speed of descent of the remainder of the aircraft sufficiently for assisting the operator to make a safe landing.

It is also desirable that the parachute assembly 200 be large enough to support the entire aircraft including the outer wing sections 14 for more safely lowering the entire aircraft if it is out of fuel, assuming the pilot can find reason to feel safe upon landing from the type of explosion that so often occurs from a wing striking the ground and the friction generated in its metal igniting and exploding its fuel.

The parachute assembly comprises a large main parachute 220 disposed at the bottom of a recess 230 having a boxlike wall 234 open at its top side except for a cover or hatch 240. The parachute recess 230 is disposed in the upper side of the fuselage 12 and the outline of its hatch 240 can be seen in FIGURE 1 with the hatch closed.

The hatch 240 extends beyond the sides of the parachute housing 234 and extends over receptacles 250 for explosive connectors 260, which latter attach the hatch 240 to the bottom of the receptacles 250 which latter are fixed to the main fuselage 12, whereby normally the hatch 240 is held in place horizontally closing the upper side of the parachute housing 234.

At desired times, the explosive connectors 260 can be exploded for blowing the hatch 240 off and clear to expose the parachute assembly 200 to the open air. At such times, a small top parachute 280 disposed above and connected to the larger parachute 220 will be caused to be sucked out of the recess 230 and since it is connected by shrouds 282 to the center of the top of the large parachute 220, the opening of the small parachute 240 will cause the large parachute 220 to be pulled out, unfolded, and filled into operative position. The shrouds 300 of the large parachute 220 are suitably connected such as by a connecting means 340, partially shown in FIGURE 6, to any desirable part of the main fuselage 12.

The wiring for the explosive connectors 260 comprises two wires 360 and 362 connected to opposite ends of each explosive connector 260 respectively. The wire 362 is connected to a wire 370 leading to a terminal of the switch 74, shown at 374. The wires 360 are each connected to a wire 96 as above described, whereby upon the closing of the switch, the explosive connectors 260 will be exploded releasing the hatch 240.

An explosive charge 390 is placed in each receptacle 250 beneath the hatch 240, whereby when the charges 390 are exploded, the hatch is blown clear of the main fuselage 12.

The charges 390 are connected by wires 400 to desired points in the explosive charges 390. Other points in the explosive charges 390 spaced from such first points mentioned are connected by wires 410 to a wire 412, which latter is connected to a terminal 416 of the switch 74, whereby upon closing of the switch 74, the charges 390 are exploded for blowing the hatch clear.

Figure 5:
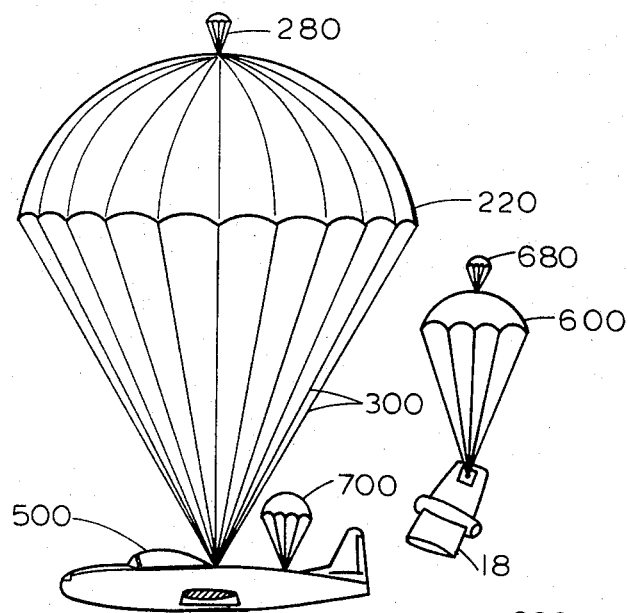
FIGURE 5 is a side elevation of the aircraft with parachute assembly in operation for lowering the fuselage.

The preferred location of a multiple throw switch 74 is within easy reach of the operator of the aircraft while the operator is in normal flying position in his compartment, which latter is illustrated at 500 in FIGURE 5.

As best seen in FIGURE 1, certain hatches 640 are disposed on the upper side and preferably at the outer ends of each outer wing section 18 and the hatches 640 are identical in principle and general construction, although likely different in size, to the hatch 240. Under the hatches 640 are parachute housings 634, as shown in FIGURE 3, having receptacles 650 for explosive connectors and, in other words, the parachute housings 634 are identical to housing 234, the hatch 640 is identical to hatch 240, and the explosive connector receptacles 650 are identical to connectors 250.

As best seen in FIGURE 6, wires 610, 662, and 660 extend outwardly from wires 410, 362, and 360 respectively on each side of the aircraft and are connected to the mechanisms associated with the explosive connector receptacles 650 in exactly the same way as the wires 410, 362, and 360 are connected to the receptacles 250.

As thus described, when the explosive material in the receptacle 250 is detonated, the explosive material in the receptacle 650 is simultaneously detonated, whereby as seen in FIGURE 5, a large parachute normally received in the parachute housing 634 is pulled out by a small parachute 680 attached thereto in the same manner as the relationship between the small parachute 280 and the larger parachute 220.

The aircraft is preferably provided with a balance parachute 700, best seen in FIGURE 5, and which is drawn out of a hatch 740 disposed rearwardly along the fuselage of the aircraft from the hatch 240, the hatch 740 having like mechanisms associated with it as compared with hatch 240 and wires 710, 762, and 760 extend to areas of hatch 740 in the same manner and are connected to the same wires in the wiring diagram of FIGURE 6 as are the wires 610, 662, and 660, just described.

It will be seen that the inner sections 16 have first and second ground engageable means, which can be wheels 900, or which can be the outer ends of the inner sections 16 themselves, such ground engageable means being attached to the respective inner portion 16 and being adapted to engage the ground during sidewise roll-over of the aircraft such engagement being at a distance from and position with respect to the fuselage 12 as to be sufficient to provide substantial safety against sidewise roll-over.

The outer sections of each wing have lengths which are each the majority of the length of the respective wing, whereby the outer sections contain substantially all fuel-carrying portions of the aircraft, whereby upon a discarding of an outer section 18, major safety is achieved because substantially all dangerous fuel-carrying portions are disconnected from the fuselage.

As thus described, it is believed that this invention fulfills the above objectives in providing an aircraft having sufficient practicality, economy, and safety to make its manufacture much more practical.

When there is danger, a pilot dare drop an expensive engine because its parachute will maintain the majority of its value, a practical feature of safety never before available.

The dropping of an engine with its fire or explosion danger is accomplished simultaneously by the dropping of all high octane fuel.

Upon crash-landing with parachute open, the parachute may attempt to pull the fuselage into a roll-over. But, there is much less danger of a roll-over when the stub wings or inner wing sections are of substantial length for causing either the wing section or the wheel to engage the ground for resisting roll-over.

I claim:

1. In combination with an aircraft having a fuselage, right and left wings extending outwardly from opposite sides of said fuselage, said wings having inner sections permanently attached to said fuselage, first and second ground engageable means attached to each respective inner wing section and adapted to engage the ground during sideways roll-over of said aircraft, such engagement being at a distance from and position with respect to said fuselage as to be sufficient to provide substantial safety against sideways roll-over, said wings having outer sections, means releasably attaching said outer section of each wing to the inner section thereof, engine means mounted on each said outer section, explosive fuel-carrying means in each outer section whereby when said releasable means for securing said outer sections to said inner sections are released, not only the fuel-carrying portion of said outer sections are discarded, but also those portions of said wings which carry said engines are also released and discarded whereby after such discarding, not only fuel in said outer sections, but also fuel in said engines, is no longer in danger of damaging the remainder of said aircraft, and controllable means operatively correlated with said releasable means for securing said sections together for controllably releasing said securing means for such discarding.

2. In combination with an aircraft having a fuselage, right and left wings extending outwardly from opposite sides of said fuselage, said wings having inner sections permanently attached to said fuselage, first and second ground engageable means attached to each respective inner wing section and adapted to engage the ground during sideways roll-over of said aircraft, such engagement being at a distance from and position with respect to said fuselage as to be sufficient to provide substantial safety against sideways roll-over, said wings having outer sections, means releasably attaching said outer section of each wing to the inner section thereof, engine means mounted on each said outer section, explosive fuel-carrying means in each outer section whereby when said releasable means for securing said outer sections to said inner sections are released, not only the fuel-carrying portion of said outer sections are discarded, but also those portions of said wings which carry said engines are also released and discarded whereby after such discarding, not only fuel in said outer sections, but also fuel in said engines, is no longer in danger of damaging the remainder of said aircraft, and controllable means operatively correlated with said releasable means for securing said sections together for controllably releasing said securing means for such discarding, automatically releasable parachute means connected to each of said outer wing sections respectively for relatively safe descent of said outer wing sections in order to prevent their destruction for saving their economic value and for preserving them for analysis to determine causes of accidents, said automatically releasable parachute means comprising parachute-receiving recesses in the upper side of each of said outer wing sections.

3. In combination with an aircraft having a fuselage, right and left wings extending outwardly from opposite sides of said fuselage, engines mounted in said wings, explosive fuel-carrying means mounted in said wings, means releasably attaching those portions of said wings which contain said fuel-carrying means and said engines to the remainder of said aircraft whereby when said releasable means is released then all portions of said wings which carry fuel and engines are discarded from the remainder of the aircraft to reduce the explosion danger to the remainder of said aircraft, and controllable means operatively correlated with said releasable means whereby an operator of said aircraft can controllably release said releasable means from said fuselage, in further combination with automatic releasable parachute means connected to said fuselage for controlling the speed of fall of said fuselage and means for controllably releasing said parachute means by an operator of said aircraft in said fuselage, automatically releasable wing parachute means connected to those separable portions of said wings which contain said engines and fuel-carrying means, and controllable means controllable by an operator in said fuselage for causing the release of said wing parachute means.

References Cited

UNITED STATES PATENTS

| | | | |
|---|---|---|---|
| 1,106,626 | 8/1914 | Chiron | 244—138 |
| 2,324,045 | 7/1943 | Vallinos | 244—139 |
| 2,665,093 | 1/1954 | Manfredi et al. | 244—139 |

MILTON BUCHLER, *Primary Examiner.*

R. A. DORNON, *Assistant Examiner.*